United States Patent
Hamaguchi et al.

(10) Patent No.: US 9,051,464 B2
(45) Date of Patent: Jun. 9, 2015

(54) FLAME-RETARDANT RUBBER COMPOSITION FOR VULCANIZATION

(75) Inventors: Koshiro Hamaguchi, Osaka (JP); Toyofumi Otaka, Osaka (JP); Taro Ozaki, Osaka (JP); Akiko Mishima, Osaka (JP)

(73) Assignee: DAISO CO., LTD., Osaka (JP)

( * ) Notice: Subject to any disclaimer, the term of this patent is extended or adjusted under 35 U.S.C. 154(b) by 224 days.

(21) Appl. No.: 13/582,338

(22) PCT Filed: Mar. 2, 2011

(86) PCT No.: PCT/JP2011/054783
§ 371 (c)(1),
(2), (4) Date: Aug. 31, 2012

(87) PCT Pub. No.: WO2011/108599
PCT Pub. Date: Sep. 9, 2011

(65) Prior Publication Data
US 2012/0322916 A1    Dec. 20, 2012

(30) Foreign Application Priority Data
Mar. 3, 2010    (JP) ................................. 2010-046939

(51) Int. Cl.
| | | |
|---|---|---|
| C08L 19/00 | (2006.01) | |
| C08L 71/03 | (2006.01) | |
| C08K 3/02 | (2006.01) | |
| C08K 3/22 | (2006.01) | |
| C08K 5/00 | (2006.01) | |
| C08K 3/00 | (2006.01) | |
| C08K 3/32 | (2006.01) | |

(52) U.S. Cl.
CPC ............... *C08L 71/03* (2013.01); C08K 3/0058 (2013.01); C08K 3/22 (2013.01); C08K 3/32 (2013.01); *C08K 5/0025* (2013.01)

(58) Field of Classification Search
USPC .................................. 252/601, 609; 523/451
See application file for complete search history.

(56) References Cited

U.S. PATENT DOCUMENTS

| | | | |
|---|---|---|---|
| 4,671,896 A | 6/1987 | Hasegawa et al. | |
| 4,869,848 A | 9/1989 | Hasegawa et al. | |
| 5,340,867 A | 8/1994 | Yagawa et al. | |
| 2006/0216518 A1* | 9/2006 | Funayama et al. | ............ 428/413 |
| 2011/0160344 A1 | 6/2011 | Shoji et al. | |

FOREIGN PATENT DOCUMENTS

| | | |
|---|---|---|
| CN | 85101465 A | 1/1987 |
| CN | 1347940 A | 5/2002 |
| CN | 101563421 A | 10/2009 |
| JP | 5-125229 A | 5/1993 |
| JP | 10-007838 A | 1/1998 |
| JP | 11-138678 A | 5/1999 |
| JP | 2000-159903 A | 6/2000 |
| JP | 2002-114913 A | 4/2002 |
| JP | 2002-114914 A | 4/2002 |
| JP | 2006-056911 A | 3/2006 |

OTHER PUBLICATIONS

First Notification of Office Action issued Feb. 7, 2014 in corresponding Chinese Patent Application No. 201180012276.6 with English translation.
Translation of the International Preliminary Report on Patentability issued Oct. 11, 2012 in International Application No. PCT/JP2011/054783 to Daiso Co., Ltd. et al.
Chinese Office Action dated Jul. 3, 2014 issued in application No. 201180012276.6.
Chinese Office Action issued in application No. 201180012276.6 dated Oct. 21, 2014.
Japanese Office Action issued in application No. 2012-503220 dated Oct. 2, 2014.

* cited by examiner

*Primary Examiner* — Michael J Feely
(74) *Attorney, Agent, or Firm* — Sughrue Mion, PLLC

(57) ABSTRACT

A flame-retardant rubber composition for vulcanization, comprising an epichlorohydrin based rubber (A), red phosphorus (B), and a vulcanizing agent (C), in which the content of the red phosphorus (B) is from 3 to 20 parts by weight for 100 parts by weight of the epichlorohydrin based rubber (A).

14 Claims, No Drawings

US 9,051,464 B2

FLAME-RETARDANT RUBBER COMPOSITION FOR VULCANIZATION

CROSS REFERENCE TO RELATED APPLICATIONS

This application is a National Stage of International Application No. PCT/JP2011/054783 filed Mar. 2, 2011, claiming priority based on Japan Patent Application No. 2010-046939 filed Mar. 3, 2010, the contents of all of which are incorporated herein by reference in their entirety.

TECHNICAL FIELD

The present invention relates to a flame-retardant rubber composition for vulcanization that is excellent in flame retardancy, and a rubber member obtained by vulcanizing the composition.

BACKGROUND ART

Hitherto, the main current of flame retarders has been bromine-containing flame retarders, which are organic halide flame retarders, and antimony trioxide, which is an auxiliary (or assisting agent) therefor. However, after the occurrence of a problem that brominated dioxin is generated when the bromine-containing flame retarders are incinerated, awareness against environmental problems has been enhanced. Under such a situation, by regulations in individual countries in the world, the motion of de-halogenation has been increasing. About antimony trioxide also, the motion of the use of a substitution therefor has been strengthening since the compound is suspected of having carcinogenicity. In our country also, hexabromocyclodecane (HBCD), which is a bromine-containing flame retarder, and antimony trioxide, which is an auxiliary therefor, are controlled as specific chemical substances by a law about examination and regulation of manufacture, etc. of chemical substances (Law Concerning the Examination and Regulation of Manufacture, etc. of Chemical Substances). In connection with these substances, at the time of discharging or shifting a chemical substance having a concentration not less than a regulated concentration, or a waste obtained after the chemical substance is used, the amount thereof is obligated to be reported in accordance with the rank about harmfulness of the substance or waste.

For these reasons, in place of bromine-containing flame retarders, halogen-free flame retarders have been developed. Examples thereof include phosphorous-containing compounds such as phosphoric acid esters and ammonium phosphate, and hydrated metal compounds such as aluminum hydroxide and magnesium hydroxide (see Patent Document 1). However, these halogen-free flame retarders are poorer in flame retarder effect than the bromine-containing flame retarders. Thus, in order to gain a sufficient flame retarder effect, the halogen-free flame retarders are each required to be added in a large amount. For this reason, the vulcanizate (concerned) is unfavorably lowered in mechanical strength. Thus, the halogen-free flame retarders have been desired to be improved.

PRIOR ART DOCUMENTS

Patent Documents

Patent Document 1: JP 2006-056911 A

SUMMARY OF THE INVENTION

Problems to be Solved by the Invention

An object of the present invention is to provide a flame-retardant rubber composition for vulcanization that is excellent in flame retardancy, and a rubber member obtained by vulcanizing the composition without lowering mechanical strength of the vulcanizate (to be obtained).

Means for Solving the Problems

The inventors have made various researches to find out that red phosphorus, which has a high phosphorous content by percentage, is used as a flame retarder and added in a small amount, thereby making it possible to yield a flame retarder rubber composition for vulcanization which exhibits flame retarder effect and further gives a vulcanizate not to be lowered in mechanical strength, and yield a rubber member in which the composition is vulcanized. Thus, the present invention has been achieved.

Accordingly, the present invention is a flame-retardant rubber composition for vulcanization, comprising an epichlorohydrin based rubber (A), red phosphorus (B), and a vulcanizing agent (C), in which the content of the red phosphorus (B) is from 3 to 20 parts by weight for 100 parts by weight of the epichlorohydrin based rubber (A).

In the present invention, it is preferred that the composition further comprises an inorganic metal compound (D).

In the present invention, the inorganic metal compound (D) is preferably one species, or a mixture of two or more species, selected from the group consisting of metal hydroxides, and metal oxides. More preferably, the inorganic metal compound (D) is one species, or a mixture of two or more species, selected from the group consisting of aluminum hydroxide, magnesium hydroxide, calcium hydroxide, molybdenum oxide, and zirconium oxide.

In the present invention, it is preferred that the vulcanizing agent (C) is at least one compound selected from the group consisting of polyamines, thioureas, thiadiazoles, mercaptotriazines, pyrazines, quinoxalines, organic peroxides, sulfur, morpholine polysulfides, and thiuram polysulfides.

Effects of the Invention

According to the flame-retardant rubber composition for vulcanization yielded by the present invention, the flame retarder therein produces flame retarder effect even when the flame retarder is added in a small amount. As a result, the composition is excellent in flame retardancy without damaging the mechanical strength of the polymer.

EMBODIMENTS FOR CARRYING OUT THE INVENTION

Hereinafter, the present invention will be described in detail.

The flame-retardant rubber composition of the present invention for vulcanization comprises an epichlorohydrin based rubber (A), red phosphorus (B), and a vulcanizing agent (C).

Examples of the epichlorohydrin based rubber (A) include epichlorohydrin homopolymer; epichlorohydrin/allyl glycidyl ether copolymer; epichlorohydrin/alkylene oxide copolymers such as epichlorohydrin/ethylene oxide copolymer, and epichlorohydrin/propylene oxide copolymer; and epichlorohydrin/alkylene oxide/allyl glycidyl ether multi-component polymers, such as epichlorohydrin/ethylene oxide/allyl glycidyl ether terpolymer, and epichlorohydrin/ethylene oxide/propylene oxide/allyl glycidyl ether quarterpolymer. The epichlorohydrin based rubber (A) is preferably epichlorohydrin homopolymer, epichlorohydrin/allyl glycidyl ether copolymer, epichlorohydrin/ethylene oxide copolymer, or epichlorohydrin/ethylene oxide/allyl glycidyl ether terpolymer, and is more preferably epichlorohydrin/ethylene oxide copolymer, or epichlorohydrin/ethylene oxide/allyl glycidyl ether terpolymer.

In the case of epichlorohydrin/ethylene oxide copolymer, or epichlorohydrin/ethylene oxide/allyl glycidyl ether terpolymer, the copolymerization or terpolymerization ratio therebetween is, for example, as follows: the proportion of epichlorohydrin is preferably from 5 to 95% by mole, more preferably from 10 to 75% by mole, even more preferably from 10 to 65% by mole; that of ethylene oxide is preferably from 5 to 95% by mole, more preferably from 25 to 90% by mole, even more preferably from 35 to 90% by mole; and that of allyl glycidyl ether is preferably from 0 to 10% by mole, more preferably from 1 to 8% by mole, even more preferably from 1 to 7% by mole. The molecular weight of the homopolymer or any one of these multi-component polymers is not particularly limited. When the molecular weight is represented by Mooney viscosity, the molecular weight is an $ML_{1+4}$ (100° C.) ranging from about 30 to 150.

The component (B), red phosphorus, is a substance represented by the following general formula (I):

[Formula 1]

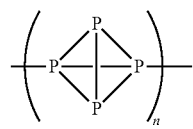
(I)

As the component (B), red phosphorus, used in the present invention, a commercially available product may be appropriately used. A product wherein the surface of red phosphorus is coated with an especial coat may be used. An example thereof is a product wherein red phosphorus is coated with aluminum hydroxide, titanium oxide or some other. As the red phosphorus content by percentage in the product is higher, it can be expected that the product produces, even in a smaller amount, flame retarder effect.

The blend amount of the component (B), red phosphorus, is preferably from 3 to 20 parts by weight for 100 parts by weight of the epichlorohydrin based rubber (A), more preferably from 3 to 15 parts by weight therefor. When the blend amount is in this range, a vulcanizate better in flame retardancy is favorably obtained.

When the flame-retardant rubber composition is required to have a higher flame retardancy for being used in a severer environment, the inorganic metal compound (D) is added to the composition. In this way, the composition can be made higher in flame retarder effect.

The inorganic metal compound (D) is preferably one selected or a mixture of two or more selected from metal hydroxides, and metal oxides. The inorganic metal compound (D) is more preferably aluminum hydroxide, magnesium hydroxide, calcium hydroxide, molybdenum oxide, and/or zirconium oxide, and is most preferably aluminum hydroxide. A vulcanized rubber of the flame-retardant rubber composition for vulcanization wherein, in particular, aluminum hydroxide as the inorganic metal compound (D), and red phosphorus (B) are incorporated into the epichlorohydrin based rubber (A) exhibits an excellent flame retardancy and an excellent mechanical strength even when the blend amount of the flame retarders is small. Thus, the rubber is most preferred.

The blend amount of the inorganic metal compound (D) is preferably from 5 to 50 parts by weight for 100 parts by weight of the epichlorohydrin based rubber (A), more preferably from 5 to 30 parts by weight therefor. When the blend amount is in this range, a vulcanizate good in flame retardancy is favorably obtained.

In order to give a vulcanizate good in both of flame retardancy and mechanical property in the present invention, the total amount of flame retarders including red phosphorus (B) and the inorganic metal compound (D) is preferably less than 30 parts by weight for 100 parts by weight of the epichlorohydrin based rubber (A).

In other words, in order that the flame retarder rubber composition can contain 3 to 20 parts by weight of red phosphorus (B) and 5 parts or more by weight of the inorganic metal compound (D) for 100 parts by weight of the epichlorohydrin based rubber (A), it is preferred that the total amount of flame retarder s including red phosphorus (B) and the inorganic metal compound (D) is less than 30 parts by weight for 100 parts by weight of the epichlorohydrin based rubber (A).

The vulcanizing agent (C) used in the present invention may be a known vulcanizing agent making use of the reactivity of chlorine atoms of the epichlorohydrin based rubber, examples thereof including polyamines, thioureas, thiadiazoles, mercaptotriazines, pyrazines, and quinoxalines; or a known vulcanizing agent making use of a side chain double bond, examples thereof including organic peroxides, sulfur, morpholine polysulfides, and thiuram polysulfides. The vulcanizing agent (C) is in particular preferably 2-mercaptoimidazoline (ethylene thiourea), 6-methylquinoxaline-2,3-dithiocarbonate, or 2,4,6-trimercapto-1,3,5-triazine. The above-mentioned vulcanizing agents (C) may be used alone or in combination of two or more thereof.

These vulcanizing agents (C) are exemplified as follows: examples of the polyamines include ethylenediamine, hexamethylenediamine, diethylenetriamine, triethylenetetramine, hexamethylenetetramine, p-phenylenediamine, cumenediamine, N,N'-dicinnamylidene-1,6-hexanediamine, ethylenediamine carbamate, and hexamethylenediamine carbamate.

Examples of the thioureas include ethylenethiourea, 1,3-diethylthiourea, 1,3-dibutylthiourea, and trimethylthiourea.

Examples of the thiadiazoles include 2,5-dimercapto-1,3,4-thiadiazole, and 2-mercapto-1,3,4-thiadiazole-5-thiobenzoate.

Examples of the mercaptotriazines include 2,4,6-trimercapto-1,3,5-triazine, 2-methoxy-4,6-dimercaptotriazine, 2-hexylamino-4,6-dimercaptotriazine, 2-diethylamino-4,6-dimercaptotriazine, 2-cyclohexaneamino-4,6-dimercaptotriazine, 2-dibutylamino-4,6-dimercaptotriazine, 2-anilino-4,6-dimercaptotriazine, and 2-phenylamino-4,6-dimercaptotriazine.

Examples of the pyrazines include 2,3-dimercaptopyrazine derivatives. Examples of the 2,3-dimercaptopyrazine derivatives include pyrazine-2,3-dithiocarbonate, 5-methyl-2,3-dimercaptopyrazine, 5-ethylpyrazine-2,3-dithiocarbonate, 5,6-dimethyl-2,3-dimercaptopyrazine, and 5,6-dimethylpyrazine-2,3-dithiocarbonate.

Examples of the quinoxalines include 2,3-dimercaptoquinoxaline derivatives. Examples of the 2,3-dimercaptoquinoxaline derivatives include quinoxaline-2,3-dithiocarbonate, 6-methylquinoxaline-2,3-dithiocarbonate, 6-ethyl-2,3-dimercaptoquinoxaline, 6-isopropylquinoxaline-2,3-dithiocarbonate, and 5,8-dimethylquinoxaline-2,3-dithiocarbonate.

Examples of the organic peroxides include tert-butylhydroperoxide, p-menthanehydroperoxide, dicumylperoxide, tert-butylperoxide, 1,3-bis(tert-butylperoxyisopropyl)benzene, 2,5-dimethyl-2,5-di(tert-butylperoxy)hexane, benzoylperoxide, and tert-butylperoxy benzoate.

Examples of the morpholine polysulfides include morpholine disulfide.

Examples of the thiuram polysulfides include tetramethylthiuram disulfide, tetraethylthiuram disulfide, tetrabutylthiuram disulfide, N,N'-dimethyl-N,N'-diphenylthiuram disulfide, dipentanemethylenethiuram tetrasulfide, dipentamethylenethiuram tetrasulfide, and dipentamethylenethiuram hexasulfide.

The blend amount of the vulcanizing agent (C) is preferably from 0.1 to 10 parts by weight for 100 parts by weight of the epichlorohydrin based rubber, more preferably from 0.5 to 5 parts by weight therefor. When the blend amount is in this range, the composition is sufficiently crosslinked so that the resultant vulcanizate does not become too rigid. Thus, the vulcanizate can favorably gain physical properties expected usually for an epichlorohydrin based rubber vulcanizate.

Together with the vulcanizing agent (C), a known accelerator (vulcanization accelerator), and a known retarder may be added to the composition for vulcanized rubber according to the present invention. Examples of the vulcanization accelerator include basic silica, primary, secondary and tertiary amines, organic salts or adducts of the amines, aldehyde ammonia based accelerators, aldehyde amine based accelerators, guanidine based accelerators, thiazole based accelerators, sulfeneamide based accelerators, thiuram based accelerators, dithiocarbamic acid based accelerators, 1,8-diazabicyclo(5,4,0)undecene-7 or weak acid salts thereof, 1,5-diazabicyclo(4,3,0)nonene-5 or weak acid salts thereof, 6-dibutylamino-1,8-diazabicyclo(5,4,0)undecene-7 or weak acid salts thereof, and quaternary ammonium compounds. Examples of the retarder include acidic silica, and N-cyclohexanethiophthalimide.

The primary, secondary and tertiary amines are in particular preferably primary, secondary and tertiary amines of aliphatic or alicyclic acids each having 5 to 20 carbon atoms. Typical examples of the amines include n-hexylamine, octyamine, dibutylamine, tributylamine, trioctylamine, di(2-ethylhexyl)amine, dicyclohexylamine, and hexamethylenediamine.

Examples of the organic acid which is combined with any one of the amines to form a salt include carboxylic acids, carbamic acids, 2-mercaptobenzothiazole, and dithiophosphoric acid. Examples of the substance which is combined with any one of the amines to form an adduct include alcohols, and oximes. Specific examples of the organic acid salt or the adduct of the amine include n-butylamine acetate, dibutylamine oleate, hexamethylenediamine carbamate, and a dicyclohexylamine salt of 2-mercaptobenzothioazole.

Examples of the aldehyde ammonia based accelerators include hexamethylenetetramine, and a reaction product made from acetoaldehyde and ammonia. Examples of the aldehyde amine based accelerators include condensation products each made from an amine and at least one aldehyde having 1 to 7 carbon atoms. Examples of the amine include aniline and butylamine. Of these examples, preferred is a condensation product made from aniline and at least one aldehyde having 1 to 7 carbon atoms. Specific examples thereof include a condensate made from aniline and butylaldehyde, a condensate made from aniline and heptaaldehyde, and a condensate made from aniline, acetoaldehyde, and butylaldehyde.

Examples of the guanidine based accelerators include diphenylguanidine, and ditolylguanidine.

Examples of the thiazole based accelerators include 2-mercaptobenzothiazole, dibenzothiazyl disulfide, and a zinc salt of 2-mercaptobenzothiazole.

Specific examples of the sulfeneamide based accelerators include N-ethyl-2-benzothiazylsulfeneamide, N-t-butyl-2-benzothiazylsulfeneamide, N,N-di-isopropyl-2-benzothiazylsulfenenamide, N,N-di-cyclohexyl-2-benzothiazylsulfeneamide, and N-oxy-di-ethylene-2-benzothiazylsulfeneamide.

Specific examples of the thiuram based accelerators include tetramethylthiuram disulfide, tetramethylthiuram monosulfide, tetraethylthiuram disulfide, tetrabutylthiuram disulfide, and dipentamethylenethiuram tetrasulfide.

Examples of the dithiocarbamic acid based accelerators include piperidine pentamethylenedithiocarbamate, zinc dimethyldithiocarbamate, and copper dimethylcarbamate.

The above-mentioned vulcanization accelerators and the retarders may each be used in the form of being preliminarily dispersed in an inorganic filler, an oil, a polymer or some other. The vulcanization accelerators and retarders may be used alone or in combination of two or more thereof. The amount of the vulcanization accelerator(s) or the retarder(s) is from 0 to 10 parts by weight, preferably from 0.1 to 5 parts by weight for 100 parts by weight of the epichlorohydrin based rubber.

The flame-retardant rubber composition of the present invention for vulcanization may contain an acid acceptor in accordance with the vulcanizing agent(s). Specific examples thereof include magnesium oxide, magnesium carbonate, barium carbonate, sodium carbonate, caustic lime, calcium carbonate, calcium silicate, calcium stearate, zinc stearate, calcium phthalate, calcium phosphite, tin oxide, lithrage, red lead, white lead, lead bibasic phthalate, lead bibasic carbonate, lead basic silicate, tin stearate, lead basic phosphite, tin basic phosphite, tin basic sulfite, lead tribasic sulfate, zeolites, aluminophosphate type molecular sieves, lamellar silicates, synthetic hydrotalcite, and alkali metal salts of titanic acid. The acid acceptor is in particular preferably magnesium oxide, calcium carbonate, caustic lime, sodium carbonate, or synthetic hydrotalcite.

The blend amount of the acid acceptor is preferably from 0.2 to 50 parts by weight, more preferably from 0.5 to 50 parts by weight, in particular preferably from 1 to 30 parts by weight for 100 parts by weight of the epichlorohydrin based rubber.

Other additives usable usually in the art may be incorporated at will into the flame-retardant rubber composition of the present invention for vulcanization, examples of the additives including a lubricant, an anti-aging agent, a filler, a reinforcing agent, a plasticizer, a processing aid, a pigment, a foaming agent, and a silane coupling agent.

In order to produce the flame-retardant rubber composition for vulcanization according to the present invention, use may be made of any mixing means used conventionally in the field of polymer processing, for example, a mixing roll, a Banbury mixer, or a kneader that may be of various types. A vulcanizing rubber material in the present invention is obtained by heating the flame-retardant rubber composition of the present invention for vulcanization into the range ordinarily from 100 to 200° C. The vulcanizing period is varied in accordance with the temperature, and is usually from 0.5 to 300 minutes.

The method for vulcanizing and shaping the material may be any method, such as compressing molding or injection molding using a mold, or heating using a steam can, an air bath, infrared rays, or microwaves.

The vulcanizate according to the present invention may be widely used in any field in which epichlorohydrin based rubber is usually used. The vulcanizate may be widely applied to various fuel-system laminated hoses, air-system laminated hoses, tubes, belts, diaphragms, seals, and other rubber matters for automobiles or others; rubber members of machines and instruments for general industries, for example, rubber rolls, belts and other members of copying machines, printers, or other devices used in an electrophotographic process; or others.

Hereinafter, the present invention will be more specifically described by way of working examples and comparative examples. However, the present invention is not limited to the working examples as far as another example to be carried out does not depart from the subject matter of the present invention.

Examples 1 to 4, and Comparative Examples 1 to 3

Each unvulcanized rubber sheet was produced by using a kneader having a volume of 1 L, the temperature of which was set to 120° C., to mix individual materials with each other at proportions shown in Table 1 and knead the materials, and next using a 7-inch open roll, the surface temperature of which was set to 70° C., to knead the materials. The resultant unvulcanized rubber sheet was pressed and vulcanized at 170° C. for 15 minutes to yield a vulcanized sheet of 2 mm thickness.

<Flame-Retardancy Test>

In a flame retardancy test, each of the vulcanized sheets prepared as described above was worked into apiece 150 mm long, 70 mm wide and 2 mm thick. The worked sheet was conditioned at 20±3° C. and a relative humidity of 50% for 24 hours. This sheet was vertically hung, and a Bunsen burner having an inner diameter of 9.5 mm was used to bring flames into contact therewith for 15 seconds. Thereafter, the sheet was taken away from the burner, and then a situation that the test piece kept burning was checked. The result is shown in Table 2.

<Tensile Test>

In a tensile test, each of the vulcanized sheets prepared as described above was used, and a tensile test was made thereabout in accordance with JIS K 6251. The result is shown in Table 3.

Blend agents used in the working examples and the comparative examples are shown below.

*1: "EPICHLOMER-CG-105: epichlorohydrin-ethylene oxide-allyl glycidyl ether copolymer", manufactured by Daiso Co., Ltd.
*2: "DHT-4A", manufactured by Kyowa Chemical Industry Co., Ltd.
*3: "P-152", manufactured by Daiso Co., Ltd.
*4: "DAISONET XL-21S", manufactured by Daiso Co., Ltd.
*5: "HISHIGAURD LP-F", manufactured by Nippon Chemical Industrial Co., Ltd.
*6: "HYGELITE H42M", manufactured by Showa Denko K.K.
*7: "PATOX-MK", manufactured by Nihon Seiko Co., Ltd.
*8: "FR CROS481", manufactured by Budenheim Co.

TABLE 1

| | Example 1 | Example 2 | Example 3 | Example 4 | Comparative Example 1 | Comparative Example 2 | Comparative Example 3 |
|---|---|---|---|---|---|---|---|
| ECH/EO/AGE copolymer rubber *1 | 100 | 100 | 100 | 100 | 100 | 100 | 100 |
| FEF carbon (reinforcing agent) | 50 | 50 | 50 | 50 | 50 | 50 | 50 |
| Di(butoxyethoxy)ethyl adipate (plasticizer) | 10 | 10 | 10 | 10 | 10 | 10 | 10 |
| Sorbitan monostearate (lubricant) | 3 | 3 | 3 | 3 | 3 | 3 | 3 |
| Nickel dibutyldithiocarbamate (anti-aging agent) | 1 | 1 | 1 | 1 | 1 | 1 | 1 |
| Synthetic hydrotalcite (acid acceptor) *2 | 3 | 3 | 3 | 3 | 3 | 3 | 3 |
| Magnesium oxide (acid acceptor) | 3 | 3 | 3 | 3 | 3 | 3 | 3 |
| Phenolic resin salt of DBU (accelerator) *3 | 1 | 1 | 1 | 1 | 1 | 1 | 1 |
| Red phosphorus (flame retarder) *5 | 5 | 10 | 15 | 5 | | | |
| Aluminum hydroxide (flame retarder) *6 | | | | 10 | | | 60 |
| Antimony trioxide (flame retarder) *7 | | | | | | 10 | |
| Ammonium polyphosphate (flame retarder) *8 | | | | | | | 30 |
| N-cyclohexylthiophthalimide (retarder) | 1 | 1 | 1 | 1 | 1 | 1 | 1 |
| 6-methylquinoxaline-2,3-dithio carbonate (vulcanizing agent) *4 | 1.7 | 1.7 | 1.7 | 1.7 | 1.7 | 1.7 | 1.7 |

TABLE 2

|  | Example 1 | Example 2 | Example 3 | Example 4 | Comparative Example 1 | Comparative Example 2 | Comparative Example 3 |
|---|---|---|---|---|---|---|---|
| Burning situation after the contact of flames | ○ | ○ | ○ | ⊙ | X | X | ⊙ |

⊙: Flames of the test piece were immediately self-extinguished (in a period less than 10 seconds).
○: Flames of the test piece were relatively rapidly self-extinguished (in a period of 10 or more seconds and less than 40 seconds).
X: The test piece burned down.

TABLE 3

| Run No. | Example 1 | Example 2 | Example 3 | Example 4 | Comparative Example 1 | Comparative Example 2 | Comparative Example 3 |
|---|---|---|---|---|---|---|---|
| $T_B$ (Mpa) | 12.4 | 12.2 | 11.5 | 11.4 | 13.6 | 12.8 | 8.6 |
| $E_B$ (%) | 610 | 575 | 620 | 570 | 685 | 675 | 360 |
| $H_S$ (Shore A) | 67 | 68 | 66 | 68 | 66 | 65 | 75 |

According to the results in Tables 2 and 3, in Comparative Example 1, wherein no flame retarder was used, and Comparative Example 2, wherein antimony trioxide was used, the test pieces burned down after flames from the burner were brought into contact therewith. In Comparative Example 3, wherein ammonium polyphosphate and aluminum hydroxide were used together, after flames from the burner were brought into contact therewith, flames of the test piece were self-extinguished; however, the vulcanizate was largely deteriorated in mechanical strength. On the other hand, in Examples 1 to 3, in each of which red phosphorus was used as a flame retarder, the test pieces did not burn down, and after several tens of seconds flames of the test pieces were self-extinguished. In Example 4, wherein aluminum hydroxide was used together with red phosphorus, the test piece was not deteriorated very much in mechanical strength. Thus, the piece was proved to be high in flame retardancy.

INDUSTRIAL APPLICABILITY

The flame-retardant rubber composition of the present invention for vulcanization may be widely used for various fuel-system laminated hoses, air-system laminated hoses, tubes, belts, diaphragms, seals, and other rubber matters for automobiles or others; rubber members of machines and instruments for general industries, for example, rubber rolls, belts and other members of copying machines, printers, or other devices used in an electrophotographic process; or others.

The invention claimed is:

1. A flame-retardant rubber composition for vulcanization, comprising an epichlorohydrin based rubber (A), red phosphorus (B), and a vulcanizing agent (C), in which the content of the red phosphorus (B) is from 3 to 20 parts by weight for 100 parts by weight of the epichlorohydrin based rubber (A), and wherein the amount of epichlorohydrin based rubber is 100 parts by weight per 100 parts by weight of total rubber present in the composition.

2. The flame-retardant rubber composition for vulcanization according to claim 1 further comprising an inorganic metal compound (D).

3. The flame-retardant rubber composition for vulcanization according to claim 2, wherein the inorganic metal compound (D) is one species, or a mixture of two or more species, selected from the group consisting of metal hydroxides, and metal oxides.

4. The flame-retardant rubber composition for vulcanization according to claim 2, wherein the inorganic metal compound (D) is one species, or a mixture of two or more species, selected from the group consisting of aluminum hydroxide, magnesium hydroxide, calcium hydroxide, molybdenum oxide, and zirconium oxide.

5. The flame-retardant rubber composition for vulcanization according to claim 2, wherein the inorganic metal compound (D) is contained in an amount of 5 to 50 parts by weight for 100 parts by weight of the epichlorohydrin based rubber (A).

6. The flame-retardant rubber composition for vulcanization according to claim 2, wherein the total amount of flame retarders including the red phosphorus (B) and the inorganic metal compound (D) is less than 30 parts by weight for 100 parts by weight of the epichlorohydrin based rubber (A).

7. The flame-retardant rubber composition for vulcanization according to claim 2, wherein the epichlorohydrin based rubber (A) is at least one polymer selected from the group consisting of epichlorohydrin homopolymer, epichlorohydrin/ethylene oxide copolymer, epichlorohydrin / allyl glycidyl ether copolymer, and epichlorohydrin/ethylene oxide/allyl glycidyl ether terpolymer.

8. The flame-retardant rubber composition for vulcanization according to claim 2, wherein the vulcanizing agent (C) is at least one compound selected from the group consisting of polyamines, thioureas, thiadiazoles, mercaptotriazines, pyrazines, quinoxalines, organic peroxides, sulfur, morpholine polysulfides, and thiuram polysulfides.

9. The flame-retardant rubber composition for vulcanization according to claim 2, wherein the vulcanizing agent (C) is at least one compound selected from 2-mercaptoimidazoline (ethylene thiourea), 6-methylquinoxaline-2,3-dithiocarbonate, and 2,4,6-trimercapto-1,3,5-triazine.

10. A rubber member, obtained by vulcanizing the flame-retardant rubber composition for vulcanization recited in claim 2.

11. The flame-retardant rubber composition for vulcanization according to claim 1 wherein the epichlorohydrin based rubber (A) is at least one polymer selected from the group consisting of epichlorohydrin homopolymer, epichlorohydrin / ethylene oxide copolymer, epichlorohydrin / allyl glycidyl ether copolymer, and epichlorohydrin / ethylene oxide / allyl glycidyl ether terpolymer.

12. The flame-retardant rubber composition for vulcanization according to claim 1 wherein the vulcanizing agent (C) is at least one compound selected from the group consisting of polyamines, thioureas, thiadiazoles, mercaptotriazines, pyrazines, quinoxalines, organic peroxides, sulfur, morpholine polysulfides, and thiuram polysulfides.

13. The flame-retardant rubber composition for vulcanization according to claim 1 wherein the vulcanizing agent (C) is at least one compound selected from 2-mercaptoimidazoline (ethylene thiourea), 6-methylquinoxaline-2,3-dithiocarbonate, and 2,4,6-trimercapto-1,3,5-triazine.

14. A rubber member, obtained by vulcanizing the flame-retardant rubber composition for vulcanization recited in claim 1.

* * * * *